US008639426B2

(12) United States Patent
Dedes et al.

(10) Patent No.: US 8,639,426 B2
(45) Date of Patent: Jan. 28, 2014

(54) GPS/IMU/VIDEO/RADAR ABSOLUTE/RELATIVE POSITIONING COMMUNICATION/COMPUTATION SENSOR PLATFORM FOR AUTOMOTIVE SAFETY APPLICATIONS

(76) Inventors: George C Dedes, Powell, OH (US); Kyriakos C Mouskos, Hoboken, NJ (US)

( * ) Notice: Subject to any disclaimer, the term of this patent is extended or adjusted under 35 U.S.C. 154(b) by 0 days.

(21) Appl. No.: 13/135,862

(22) Filed: Jul. 15, 2011

(65) Prior Publication Data

US 2012/0290146 A1 Nov. 15, 2012

Related U.S. Application Data

(60) Provisional application No. 61/399,613, filed on Jul. 15, 2010.

(51) Int. Cl.
*G06F 7/00* (2006.01)
(52) U.S. Cl.
USPC ............. 701/65; 701/117; 701/118; 701/119; 701/423
(58) Field of Classification Search
USPC ..................... 701/65, 117–119, 423
See application file for complete search history.

(56) References Cited

U.S. PATENT DOCUMENTS

| 5,821,879 | A * | 10/1998 | Liepmann ...................... 340/942 |
| 6,195,020 | B1 * | 2/2001 | Brodeur et al. ................ 340/933 |
| 2002/0116126 | A1 * | 8/2002 | Lin ................................ 701/214 |
| 2003/0102997 | A1 * | 6/2003 | Levin et al. ...................... 342/57 |
| 2003/0179084 | A1 * | 9/2003 | Skrbina et al. ................ 340/435 |
| 2004/0167740 | A1 * | 8/2004 | Skrbina et al. ................ 702/127 |
| 2004/0262063 | A1 * | 12/2004 | Kaufmann et al. ........... 180/169 |
| 2006/0119473 | A1 * | 6/2006 | Gunderson et al. ........... 340/435 |
| 2006/0293856 | A1 * | 12/2006 | Foessel et al. ................ 701/301 |
| 2007/0043491 | A1 * | 2/2007 | Goerick et al. ................. 701/41 |
| 2008/0189012 | A1 * | 8/2008 | Kaufmann ....................... 701/41 |
| 2008/0189039 | A1 * | 8/2008 | Sadekar et al. ............... 701/301 |
| 2008/0215204 | A1 * | 9/2008 | Roy et al. ........................ 701/28 |
| 2009/0292468 | A1 * | 11/2009 | Wu et al. ........................ 701/301 |
| 2010/0019880 | A1 * | 1/2010 | Huang et al. .................... 340/5.1 |
| 2010/0076684 | A1 * | 3/2010 | Schiffmann et al. ........... 701/301 |
| 2010/0121518 | A1 * | 5/2010 | Tiernan et al. ................. 701/26 |
| 2010/0164789 | A1 * | 7/2010 | Basnayake ............... 342/357.04 |
| 2010/0191391 | A1 * | 7/2010 | Zeng ................................ 701/1 |
| 2010/0228419 | A1 * | 9/2010 | Lee et al. ......................... 701/25 |
| 2010/0253597 | A1 * | 10/2010 | Seder et al. ....................... 345/7 |
| 2010/0289632 | A1 * | 11/2010 | Seder et al. .................... 340/436 |
| 2011/0109475 | A1 * | 5/2011 | Basnayake et al. ........... 340/902 |
| 2011/0190972 | A1 * | 8/2011 | Timmons et al. .............. 701/29 |

\* cited by examiner

*Primary Examiner* — Calvin Cheung
(74) *Attorney, Agent, or Firm* — Lowe Hauptman & Ham, LLP

(57) ABSTRACT

A GPS/IMU safety sensor platform is proposed, consisting of data fusion Processors, GNSS Signal Acquisition and Tracking Processors, MEMS IMU sensors, one or multiple accelerometers able to provide orientation information, optional V2V communication modules, and optional V2I communication modules. The data fusion processors provide interface ports to GNSS/IMU processors, odometers, video (Visual/Infrared) cameras installed in the vehicle, V2V relative positioning sensors (laser, radar or any other distance measuring), and V2V and V2I communication modules. The data fusion processors are interfaced to a driver warning system and optionally to the vehicle controls for providing safety warning messages to drivers, or for automatic control the vehicle for preventing and reducing accidents.

18 Claims, 4 Drawing Sheets

Patent GPS/IMU Safety Sensor and Communication platform Architecture for Automotive Safety Applications

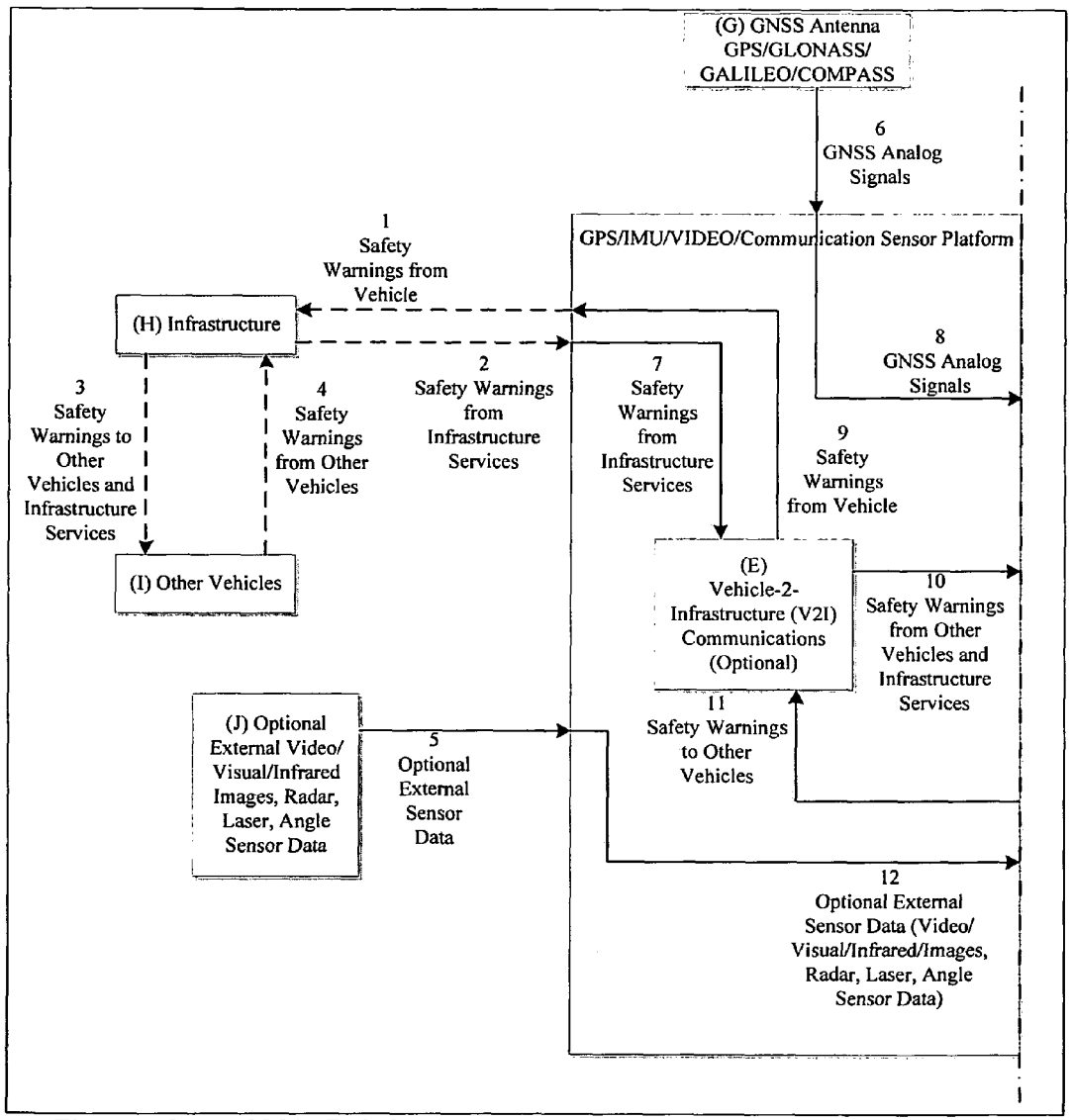
Figure 1: Patent GPS/IMU Safety Sensor and Communication platform Architecture for Automotive Safety Applications

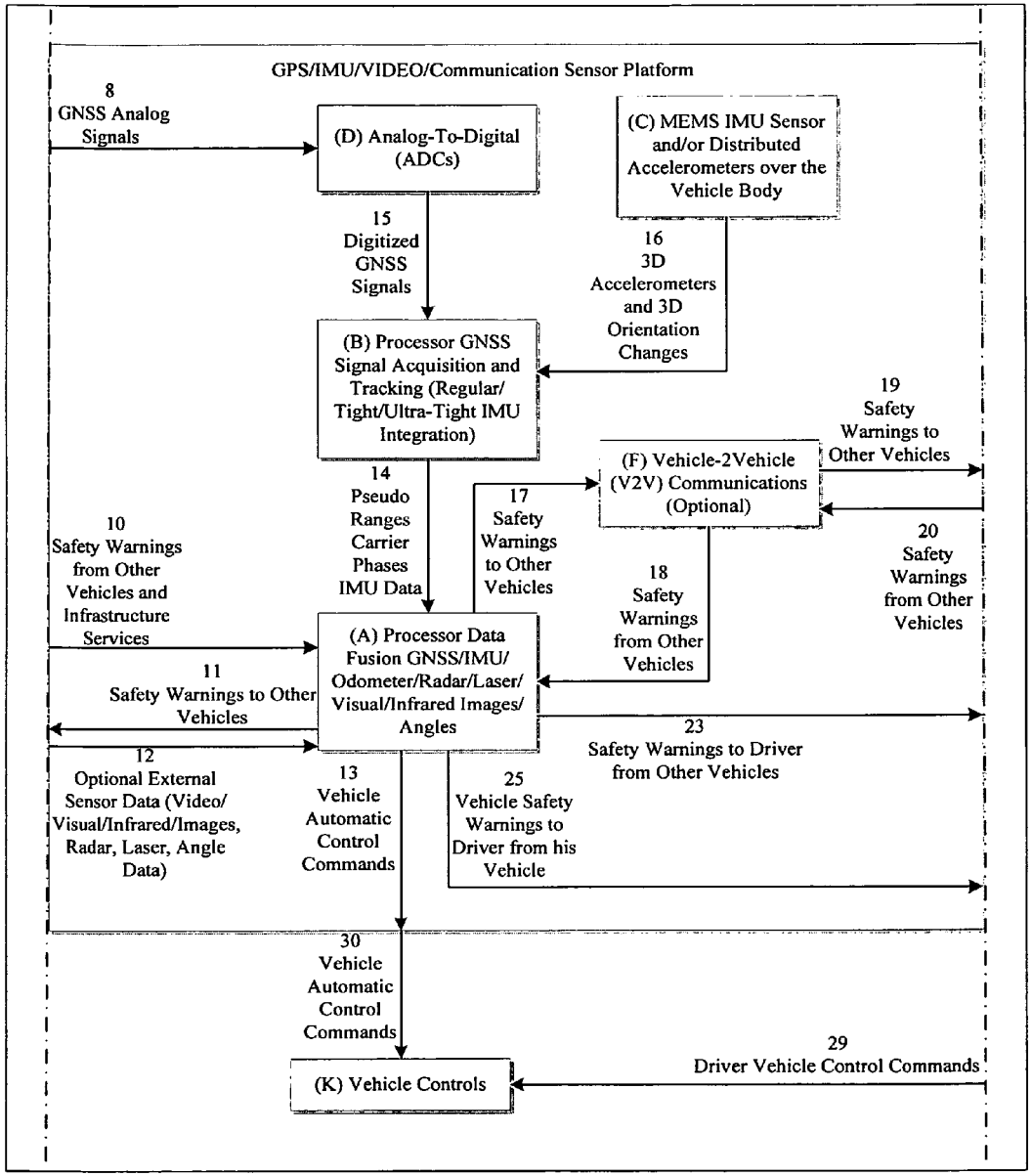
Figure 1: Patent GPS/IMU Safety Sensor and Communication platform Architecture for Automotive Safety Applications – Continued

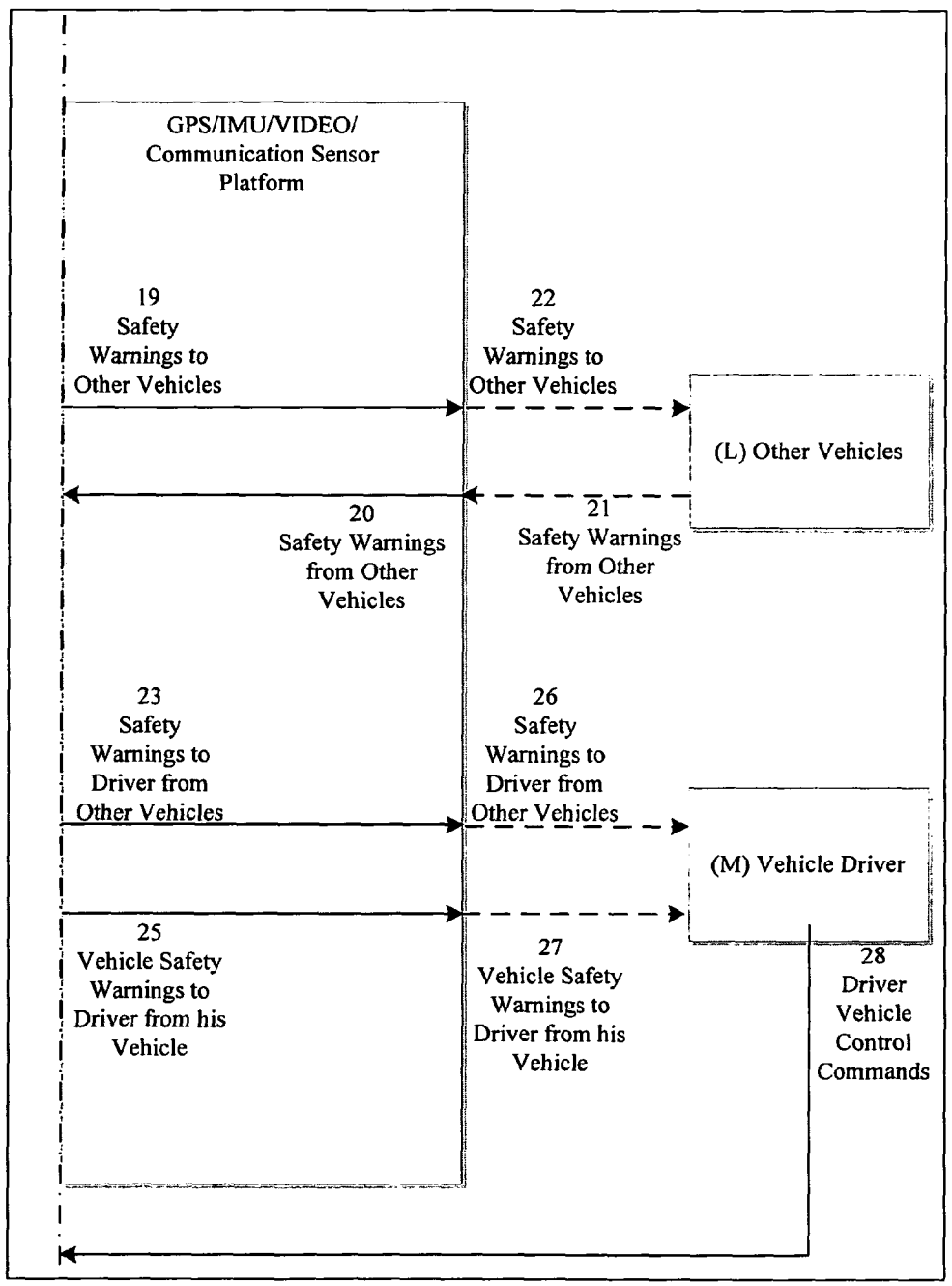
Figure 1: Patent GPS/IMU Safety Sensor and Communication platform Architecture for Automotive Safety Applications – Continued

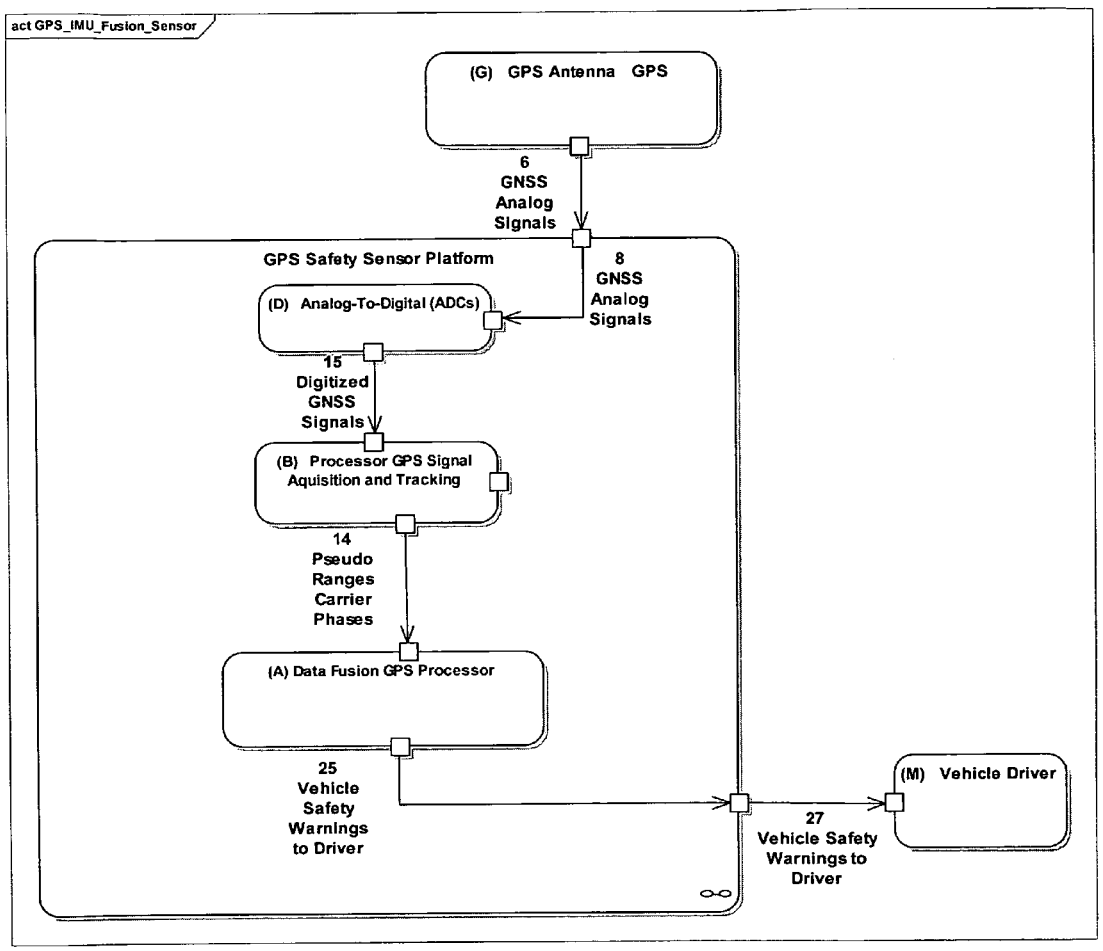
Figure 2: Patent GPS/IMU Safety Sensor and Communication platform simple Architecture for Automotive Safety Applications

GPS/IMU/VIDEO/RADAR ABSOLUTE/RELATIVE POSITIONING COMMUNICATION/COMPUTATION SENSOR PLATFORM FOR AUTOMOTIVE SAFETY APPLICATIONS

This non-provisional patent application is claiming the benefit of the provisional patent application filed on Jul. 15, 2010 with application No. 61/399,613 under the United States Patent and Trademark Office.

BACKGROUND OF INVENTION

The current invention is in the technical field of the positioning platforms (absolute/relative) and associated computations for safety applications in the automotive industry. More particularly this invention is in the field of absolute/relative GPS/GNSS/Odometer/IMU/Radar/Video absolute/relative positioning devices for safety applications in the automotive industry.

The navigational devices installed in the cars today are GPS devices with an accuracy ranging from 2-3 meters to 10-15 meters. Because of the low GPS positioning accuracy, the car GPS navigational devices are not used for roadway safety applications. These GPS navigational devices are only used for navigational purposes providing directions to navigate the cars from the current location to a user predefined destination. The various devices installed in the cars today including radar sensors, video cameras, GPS devices, odometers process the information independently and do not combine all this information optimally in a central processor either installed inside a host vehicle (moving vehicle) or in a cloud-server to determine absolute position and orientation (pitch, yaw and roll) of a host vehicle (moving vehicle) and its relative position and orientation (pitch, yaw and roll) relative to the other cars (vehicles) in the network.

The current GPS navigation devices have low accuracy and they are not integrated with the other sensors, such as odometers, Inertial Navigation (Measurement) (IMUs), video cameras for safety applications, relative-positioning devices (e.g., radars), Vehicle-To(2)-Vehicle (V2V), and Vehicle-To(2)-Infrastructure (V2I) communications. The lack of positioning accuracy, the absence of orientation information and the lack of integration with other sensors, such as those mentioned above, prevent the current GPS navigation devices from being used for safety applications aiming to reduce and/or to eliminate accidents, by issuing warnings to the drivers, or directly interfacing with the controls of the host vehicle to prevent unavoidable accidents.

BRIEF SUMMARY OF INVENTION

The present invention is a GPS/IMU safety sensor platform consisting of a central data fusion processor integrated with or having data communication paths to 1) one or more GNSS signals Acquisition and Tracking (all or selected GNSS signals) processors (i.e., ASIC, FPGA, DSP or GPP); 2) one or more MEMS IMU sensors with optional multiple accelerometers distributed over the body of the host vehicle and able to provide orientation information (pitch, yaw and roll); 3) to optional V2V communication module(s) and/or optional V2I communication module(s); 4) to an odometer; 5) to video (Visual/Infrared) cameras installed in the car; 5) V2V relative positioning (e.g., laser, radar, inclinometer, compass) sensors and 6) to the driver warning system and optionally to the vehicle controls.

The proposed architecture allows the central data fusion processor to process all the measurements simultaneously in order to estimate the host vehicle position within a single lane and its orientation and to establish safety situational awareness in the neighborhood of the host vehicle using the data from a GPS/IMU processor, odometer, video cameras, radar sensor(s), other sensors installed in the host vehicle and data from the other cars in the network. When unsafe vehicle driver behavior is identified or unsafe driving conditions are detected in the neighborhood of the host vehicle, the warning module of the data fusion processor will issue safety warnings to the neighboring cars through the V2V communication module and/or to the rest of the network through the V2I communication module. Optionally, the data fusion processor will include an automated safety module able to issue commands to the vehicle controls to prevent unavoidable accidents, and a warning module to issue visual and/or audio warnings to the driver.

The proposed GPS/IMU/Safety Sensor platform provides the basis for an open architecture allowing the users (i.e., car manufacturers) to incorporate their own data-fusion algorithms, warning and/or safety modules.

In the context of this patent "processor" means Field Programmable Gate Array(s) FPGAs, one or multiple processors with multi and/or single-cores Digital Signal Processors (DSPs) and/or General Purpose Processors (GPPs), and/or Central Processing Units (CPUs), and/or Application Specific Circuits (ASICs) and/or any other ICs designed for a range of specialized applications.

BRIEF DESCRIPTION OF THE DRAWINGS

FIG. 1 is a drawing for the system architecture of the present invention;

FIG. 2 shows a simplified version of the proposed invention;

DETAILED DESCRIPTION OF THE INVENTION

The proposed GPS/IMU Safety Sensor and Communication platform for Automotive Safety Applications, shown in FIG. 1, provides an open architecture to interface with video camera(s), radar/laser sensor(s), GPS/IMU data from other vehicles, odometer, other vehicle-to-vehicle relative positioning devices and V2V and the V2I communication modules. The GPS/IMU device will estimate in real-time the vehicle position within a single lane of the road and the vehicle orientation (i.e., pitch, yaw and roll). The lasers/radars and/or the video visual/infrared cameras, and/or GNSS/IMU data (GNSS carrier phases, GNSS pseudo-ranges, 3D/2D orientation and acceleration rates) from other vehicles will be used to determine the relative position of the current vehicle with respect to rest of the vehicles in the traffic network.

All these data sources are fused together at the measurement level to estimate optimally the host vehicle orientation, vehicle position within a single lane, and the relative position and orientation of the host vehicle with respect to the rest of the vehicles in the traffic network. This information forms the basis to determine impending preventable or non-preventable accidents based on vehicle type and dynamics. Warnings, through the warning module, will be issued to the driver and to the other drivers in the network, through either the V2V and/or the V2I communication modules. When it is determined that an impending accident is not driver-preventable, commands will be issued automatically to the vehicle controls to prevent the accident automatically.

In FIG. 1, (A) is a central data fusion processor (fuses GPS/IMU/Accelerometers/Radar/Laser/Angles-azimuth-elevation data, etc), (B) is a GNSS signal acquisition and tracking/IMU integration processor (tight/ultra-tight integration), (C) is the MEMS IMU and/or accelerometer(s) distributed sensor(s), (D) is an Analog-to-Digital/Down-convert IF section of the GPS receiver, (E) is a V2I communication module, (F) is a V2V communication module, (G) is a GNSS antenna and associated circuits with a (Low Noise Amplifier) LNA, (H) is the network infrastructure (GSM/CDMA/WiMax/LTE etc wireless networks), (I) represents all the other vehicles in the network communicating with the Infrastructure, (J) represents all optional relative positioning sensors (i.e., Laser/Radar, Visual/Infrared video cameras, angle sensors, GPS/IMU data from other vehicles, etc.), (K) represents the vehicle controls, (M) represents the vehicle driver, and (L) represents the other vehicles in the neighborhood of the current vehicle able to communicate with the current vehicle through a V2V communication device.

In more detail still referring to FIG. 1, the GNSS antenna (G) will pass the analog GNSS signal data (6) to the ADC module (D) (8). The ADC module (D) will convert the analog signals to digital signals, and will transmit (15) the digitized GNSS signals to the GNSS Signal/Acquisition tracking processor (B). The GNSS Signal/Acquisition tracking processor (B) will also receive the real-time data from the IMU sensor/distributed accelerometer sensor (C) (16) and will transmit (14) the estimated GNSS pseudo-ranges and carrier phases with the raw and/or corrected IMU data to the Data Fusion Processor (A). The Data Fusion Processor (A) will also receive data (5)-(12) from optional external sensors (i.e., Video Infrared/Visual images, Radar, Lasers, Angle measurement sensors, GPS/IMU data of the host vehicle and from the other vehicles, etc.) (J). All this information will be processed (fused) simultaneously to estimate optimally in real-time the position and orientation of the host vehicle, and its relative position with respect to its neighboring vehicles and the rest of the vehicles in the network.

The data fusion processor (A) will estimate and monitor the vehicle trajectories in real-time, estimate the vehicle dynamics (position/speed/orientation) of the trailing and/or leading vehicles (i.e., vehicle space and time headways, lane changing behavior, gap acceptance, acceleration and deceleration characteristics, etc.), estimate the deviations of vehicle trajectories from the expected normal ones, such as roadway departures, movement around roadway obstacles (i.e., potholes, debris, disabled vehicles, and other obstacles), detect sudden stops, detect vehicle sliding, and vehicle trajectories moving at 90 degrees within signalized/un-signalized intersections. This information together with vehicle dynamics modeling will be used to predict several types of crashes, and impending accidents due to trailing collisions, side collisions, lane departures, road departures, sliding and any other type of collisions or accidents predictable by the real-time data received and integrated within the data fusion processor (A), as described above.

The above information obtained at the data fusion processor (A), as described above, will form the basis to monitor the safety status of the vehicle with respect to the road, the neighboring vehicles, and the rest of the network. The Data Fusion processor (A) will transmit (25)-(27) all or selected warning messages to the vehicle driver (H), will transmit (17) all or selected warnings messages to the Vehicle-2-Vehicle communication module (F), will transmit (11) all or selected messages to the Vehicle-2-Infrastructure communication module (E), and will transmit (13)-(30) automatic control commands to the Vehicle controls (K). The commands transmitted (13)-(30) to the Vehicle Controls (K) are only those related to impending driver-no-preventable accidents.

The data fusion processor (A) will receive safety warning signals from other vehicles through the Vehicle-2-Infrastructure (10) communication module (E) and/or through the Vehicle-2-Vehicle communication (18) module (F).

The Vehicle-2-Vehicle communication module (F) will transmit (19)-(22) safety warning and additional data information to the other neighboring vehicles (L), and will receive (21)-(20) safety warning information and/or additional data from the neighboring vehicles (L). The Vehicle-2-Infrastructure communication module (E) will transmit (9)-(1) safety warning information and/or additional data to the Infrastructure (H), and it will receive (2)-(7) safety warnings or additional data from the Infrastructure (H). The additional data include and are not limited to videos from other vehicles, vehicle-related data (i.e., vehicle operational status) from other vehicles, GPS/EMU data from other vehicles, and infrastructure related information.

The Infrastructure (H) will transmit (3) safety warnings and additional data to the other vehicles (I), and will receive (4) safety warnings and additional data from the other vehicles (I). The additional data include and are not limited to videos from other vehicles, vehicle-related (i.e., operational status) data from other vehicles, GPS/IMU data from other vehicles, and infrastructure related information.

The optional External module (J) consists of components to interface with external Infrared/Visual video data, Images, radar data, laser data, angle data and any other data available from the host vehicle sensors detecting the activity in the neighborhood of the vehicle.

The MEMS IMU sensor and/or distributed accelerometers (C) consists of only an IMU sensor and/or 3 or more accelerometers distributed over the body of the vehicle able to provide both acceleration and orientation rate information. This information is transmitted (16) for further processing to the GNSS signal acquisition processor (B) and/or to the central data fusion processor (A).

In further detail, still referring to FIG. 1, the proposed invention consists of the central Data Fusion processor (A) connected to a GNSS (receiver) and/or IMU (sensor) and optionally to a Vehicle-2-Vehicle (V2V) communication module, to a Vehicle-2-Infrastructure (V2I) communication module, and to additional optional external sensors (i.e., GPS/IMU data from other vehicles, relative ranges and speeds from Laser/Doppler/Radar/Video cameras, etc). The GNSS data and/or orientation rate and acceleration data from the current vehicle are fused with the radar/laser/Doppler/video/GPS-IMU from other vehicles to provide the position, speed and orientation information of the current vehicle with respect to the other vehicles in the network.

This information is then used to predict impending accidents and generate warnings for the driver of the current vehicle and for the drivers of the rest of the vehicles in the network. For those impending accidents which are considered driver-non-preventable, control commands will be routed to the controls of the vehicle to prevent these accidents.

In the absence of Vehicle-2-Vehicle (F) and Vehicle-2-Infrastructure (I) communication modules the GNSS (B) and/or IMU (C) and/or any data from the other optional sensors (J) will be stored in an external storage device installed inside the vehicle. This information may be accessed off-line for investigating driving behavior and/or accidents (i.e., vehicle black-box).

The construction details of the invention as shown in FIG. 1 are that the central Data Fusion processor (A) (i.e., can be any combination of Multi/Single-core of GPPs, DSPs, FPGAS, CPUs, or other ICs for specific product line applications). The GNSS Signal/Tracking and acquisition processor can also be any combination of GPPs, DSPs, CPUs, FPGAs, ASICs, or ICs specifically designed for GNSS acquisition and tracking. The Vehicle-2-Vehicle (V2V) and/or the Vehicle-2-Infrastructure (V2I) communication cards could employ any wireless technology such as short range communications, GSM, GPSRS, CDMA, W-CDMA, CDMA2000, WiMax, LTE based on either TDMA, CDMA, OFDMA or any combination of these wireless technologies thereof.

Referring now to the invention shown in FIG. 1, the central Data Fusion processor (A), the GNSS Signal Acquisition processor (B), the MEMS/IMU and/or accelerometer sensor(s) (C), the Analog-to-Digital Converter (D), the Vehicle-2-Infrastructure (V2I) communication module (E), and the Vehicle-2-Vehicle (V2V) communication module (F) can be separated or any combination of them could be integrated into one or multiple PCBs.

Referring now to the invention shown in FIG. 2 the safety platform for automotive applications consists of only the central Data Fusion GPS Processor (A), the GPS Signal Acquisition and Tracking Processor (B), the Analog-To-Digital part (D) of the receiver and the GPS Antenna with the supporting LNA components (G) able to track the L1 and/or L2 GPS signals.

Referring further to the invention shown in FIG. 2 the GPS antenna (G) and the supporting LNA components transfer (6)-(8) the analog GPS signals to the ADC device (D). The ADC device (D) converts the analog signals to digital signals and transfer (15) the digitized signals to the GPS signal acquisition and tracking processor (B). The GPS signal acquisition and tracking processor (B) will acquire and track the L1 and/or L2 signals and will generate pseudo ranges and carrier phases. These measurements will be transferred (14) to the central Data Fusion GPS processor (A). The Data Fusion GPS Processor will compute the position, the speed of the vehicle, and the trajectory of the host vehicle to determine if the driver drives the vehicle safely (i.e., speed limits, trajectory consistency with the road alignment, etc). When the Data Fusion Processor (A), determines that there are safety concerns, it will issue (25)-(27) safety warnings to the Vehicle Driver (M).

The current invention is intended to cover any combination of sensors used for safety automotive applications ranging from FIG. 1 to FIG. 2.

The advantages of the present invention include, without limitation, the use of the latest wireless communication technologies, the use of the latest GNSS technologies, combined with all the other sensors installed in the vehicles (i.e., video images, lasers, radars, IMU, accelerometers, etc.) to determine optimally the safety of the vehicles in the roads and to issue safety warning to all the drivers whose vehicles might be affected. When impending driver-non-preventable accidents are detected, the proposed sensor will automatically issue commands to the vehicle controls with the objective to prevent impending driver-non-preventable accidents.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The invention claim is:

1. An automotive safety system comprising:
a central data fusing processor;
a Vehicle-2-Vehicle (V2V) communication module;
a Vehicle-2-Infrastructure (V2I) communication module;
vehicle controls on a host vehicle;
a GNSS signal tracking and acquisition device;
an Inertial Measurement Unit (IMU) sensor; and
a GNSS/IMU integration processor configured to receive data from the GNSS signal tracking and acquisition device and the Inertial Measurement Unit (IMU) sensor and transmit integrated data to the central data fusing processor;
wherein the host vehicle and at least one other vehicle is part of a network and the central data fusing processor is configured to optimally combine at least two of other vehicle Inertial Measurement Unit (IMU) measurements, other vehicle radar measurements, other vehicle image measurements, other vehicle compass measurements, other vehicle inclinometer measurements, and other vehicle sensor measurements are to compute relative position and relative orientation of the host vehicle with respect to other vehicles in the network.

2. The system of claim 1, further comprising at least one of an accelerometer, a radar, a video camera, a compass, an inclinometer, or an odometer.

3. The system of claim 1, wherein the host vehicle is part of a network and the V2V communication module and the V2I communication module facilitate reception of GNSS carrier phase and pseudo range measurements as well as orientation and acceleration information from other vehicles in the network.

4. The system of claim 1, wherein the host vehicle is part of a network and the V2V communication module and the V2I communication module facilitate reception of measurements from positioning sensors in other vehicles in the network.

5. The system of claim 1, wherein the IMU sensor is one or more accelerometers distributed over the host vehicle.

6. The system of claim 1, wherein the central data fusing processor is configured to issue automated commands for avoiding impending accidents to the vehicle controls.

7. The system of claim 1, wherein the central data fusing processor is configured to issue warning messages to host vehicle audio and display devices.

8. The system of claim 1, wherein the host vehicle is part of a network and the central data fusing processor, the V2V communication module, and the V2I communication module are configured to issue one or more warnings to other vehicles in the network.

9. The system of claim 1, wherein the host vehicle is part of a network and the central fusing data processor is configured to store, in a permanent storage device, the host vehicle and other network vehicle positioning measurement information for post-mortem analysis.

10. The system of claim 1, wherein the central data fusing processor comprises any combination of multi/Single-core of GPPs, DSPs, FPGAS, CPUs, or other ICs for specific product line applications.

11. The system of claim 1, wherein the central data fusing processor resides inside a remote server located within an Internet cloud infrastructure.

12. The system of claim 1, wherein the GNSS Signal/Tracking and acquisition device can be any combination of GPPs, DSPs, CPUs, FPGAs, ASICs, or ICs specifically designed for GNSS acquisition and tracking.

13. The system of claim 1, wherein the host vehicle is part of a network and the central data fusing processor is configured to estimate position and orientation of the host vehicle and relative position and orientation of the host vehicle with respect to other vehicles in the network.

14. The system of claim 1, wherein the central data fusing processor is configured to optimally combine at least two of host vehicle GNSS measurements, host vehicle Inertial Measurement Unit (INU) measurements, host vehicle accelerometer measurements, host vehicle radar measurements, host vehicle video data, host vehicle compass measurements, and host vehicle inclinometer measurements to improve position and orientation estimation of the host vehicle.

15. The system of claim 1, wherein the host vehicle is part of a network and the central data fusing processor is configured to optimally combine GNSS measurements from other vehicles in the network with corresponding measurements of the host vehicle to estimate relative position of the host vehicle with respect to other vehicles in the network.

16. The system of claim 1, wherein the central data fusing processor is configured to optimally combine position and orientation information of the host vehicle with vehicle dynamics theory for different types of vehicles to estimate impending accidents and issue warnings to a driver of the host vehicle or automatically invoke the host vehicle controls in order to avoid accidents.

17. The system of claim 1, wherein the host vehicle and other vehicles are part of a network and the central data fusing processor is configured to optimally combine the relative position, speed and orientation of the host vehicle with respect to other vehicles in the network with vehicle dynamics theory for different type of vehicles to compute the real-time trajectories of the host vehicle and other vehicles in the network and predict impending accidents.

18. The system of claim 1, wherein the central data fusing processor is configured to make predictions of impending accidents, issue warning messages to a driver of the host vehicle, and issue commands automatically to the vehicle controls to avoid impending accidents for which the driver has not enough time to respond.

* * * * *